United States Patent [19]
Lonneker et al.

[11] 3,899,609
[45] Aug. 12, 1975

[54] PROCESS FOR CHEMICALLY BONDING ANIMAL PROTEIN TO PEELED KERNELS OF CEREAL GRAINS

[76] Inventors: Neal A. Lonneker, Star Rte., Prescott, Wash. 99348; Herman H. Miller, Jr., 13880 S.W. Hargis Rd., Beaverton, Oreg. 97005; George M. Pigott, 5834 N.E. 181st St., Seattle, Wash. 98133

[22] Filed: Jan. 4, 1974

[21] Appl. No.: 430,747

Related U.S. Application Data

[63] Continuation-in-part of Ser. Nos. 734,529, June 5, 1968, abandoned, and Ser. No. 179,150, Sept. 9, 1971, abandoned.

[52] U.S. Cl. .................. 426/287; 426/93; 426/208; 426/212; 426/353; 426/355; 426/364
[51] Int. Cl.$^2$ ....................... A23J 3/00; A23L 1/172
[58] Field of Search ............. 426/93, 208, 272, 273, 426/289, 295, 352, 459, 455, 287, 212, 353, 364

[56] References Cited
UNITED STATES PATENTS

| | | | |
|---|---|---|---|
| 2,836,495 | 5/1958 | Thompson et al. | 426/295 |
| 2,890,117 | 6/1959 | Cantor | 426/185 |
| 3,450,540 | 6/1969 | Graham et al. | 426/295 |

*Primary Examiner*—Raymond N. Jones
*Assistant Examiner*—R. A. Yoncoskie
*Attorney, Agent, or Firm*—Roy E. Mattern, Jr.

[57] ABSTRACT

A process of fortifying cereal grains with animal protein and thereby producing a non-abradable, commercially handleable new food or food supplement. Kernels are alkali-peeled whereafter dry or liquid animal protein is added followed by the addition of a food grade acid and drying. The animal protein reacts with the alkaline kernel surfaces and probably becomes an integral part of the aldehyde amino structure of the kernels. The food grade acid sets the animal protein and neutralizes the animal protein and peeled kernels.

4 Claims, No Drawings

PROCESS FOR CHEMICALLY BONDING ANIMAL PROTEIN TO PEELED KERNELS OF CEREAL GRAINS

CROSS-REFERENCES

This application is a continuation-in-part application based on two previous applications, application Ser. No. 734,529 filed June 5, 1968 by Neal A. Lonneker, Herman H. Miller, Jr., and George M. Pigott, and entitled "New Food Supplements and Foods and Methods of Their Manufacture that are Nutritionally Balanced in Proteins", and also application Ser. No. 179,150 filed Sept. 9, 1971 by the same applicants and with the same title, both applications now abandoned.

BACKGROUND OF INVENTION

Before this invention cereal products of enhanced protein content have been provided by cooking rice, corn or like particles with soy protein sources under pressure to achieve a homogeneous composite followed by particle forming, as set forth in U.S. Pat. No. 2,421,216. Further, dry protein powders or flours have been added to moistened cooked or uncooked cereal grains or particles, with and without peeling, and completing the addition by the application of moist or dry heat, as set forth in U.S. Pat. No. 2,836,495. Also, after moistening or alkali peeling cereal grain, it has been gelatinized or expanded to modify its water absorption, as set forth in U.S. Pat. Nos.: 3,132,948 — Bulgar; 3,264,113 — Chemically Peeled; 3,358,723 — Continuous Peeled; and 3,228,771 — Mechanically Peeled. Moreover in Graham, et al.'s U.S. Pat. No. 3,450,540, a method of trying to set an adherent coating has been described, concerning inactivating the enzymes, stabilizing the coating and reducing the moisture content by application of heat. Graham et al., essentially, take dry peeled kernels of cereal grain, then moisten them, thereafter tumble the moistened kernels with a dry protein, and subsequently dry the resulting mixture by heating. Also there are two very effective processes developed by others which may be used in part in practicing this invention. They are the "Wurld" wheat process and the "Bulgar" wheat process. With reference to obtaining fish protein concentrates, there are conventional methods which involve: cooking; pressing to remove water and oil; and drying, using various types of equipment to spin out, to draw out, and to dry out various starting ingredients. There are also solvent or chemical extraction techniques which are combined at times with conventional methods to improve the products by removing rancid tasting oil and fish odors. Some of these solvent or chemical extraction techniques involve: contacting ground and/or homogenized fish with an organic solvent such as isopropyl alcohol and then drying the extracted solids; the azeotropic distillation extraction of fish, not using water, but using immiscibility properties of solvents such as ethylene dichloride; and the adjustment of pH with acid to produce a brine-acid solution for aqueous extraction of ground and/or homogenized fish. In addition, new fish protein concentrates are being obtained by processes which involve using biological methods in combination with secondary treatments that remove oil and components. One of these biological methods is described as an enzyme liquidification of fish protein that is brought about by controlling the pH at a controlled temperature.

These prior developments have not been entirely satisfactory. The people seriously needing full diets have not been successfully enticed to add supplements of cereal grains and animal proteins, either at all, or in proper proportions to their daily prepared foods. Therefore this invention becomes extremely important to irreversibly combine the basic food ingredients, the cereal grains and the animal proteins, so they remain combined and will not break down with the protein separating out prior to or in mechanical cooking processes, and therefore, the protein will be consumed in this complete food or food supplement.

In respect to these previous methods and products, and especially in reference to Graham et al.'s pre-prepared product to be handled, stored, shipped, and delivered before use in a kitchen, the starchy surface layers have been known to always abrade during any kind of handling. This abrasion results in loss of the surface layer with its adhering protein. The loss occurs because during a process like Graham et al.'s, the remoistening of the previously dried peeled kernels of grain causes little structural change in the starch thereof, and therefore does not prepare the starch for a chemical bonding with some of the protein. Moreover, the dried peeled kernels of the grain, used by Graham et al., have surfaces that are acidic as a result of their prior processing. This acidic surface weakens any potential of cross linking, and, as a consequence, any subsequent moistening or steaming does not alter the surface of the kernels of grain sufficiently enough to create any chemical bonding.

SUMMARY OF THE INVENTION

This invention, involves new food supplements and new foods which are pre-prepared to be subsequently handled, stored, shipped, and delivered before use in a kitchen and there is no abrasion at any time due to the commercial handling of these products. The field grains are alkali peeled to remove testa and the peeled kernels of grain keep their alkaline surface. In a hot alkaline peeling embodiment of this process, the starch is gelatinized while leaving an alkanine surface structure that is not degraded. In the cold alkaline peeling embodiment of this process, the starch is not gelatinized and the surface remains alkaline. The alkaline surface of either the hot or cold embodiment, creates the desired solubility and reaction of the protein with the surface of the starch of the kernels. Then almost concurrently with the introduction of the animal protein to the alkaline surfaces of the peeled kernels of grain, a food grade acid is added to both neutralize the product and to set the protein, resulting in a tightly bound protein, which is believed to become an integral part of an aldehyde amino structure of the overall resulting products, referred to as protein fortified peeled kernels of cereal grains. Essentially, all of the animal protein remains non-abradably fixed to the peeled kernels of cereal grain. As a consequence, when the animal protein fortified peeled kernels of cereal grains are eaten, the entire nutritional benefit of this protein fortified food supplement or food is fully realized.

Terminology in Reference to This Invention

As indicated previously and hereinafter used, the terms "animal" protein materials and "cereal grain" materials mean respectively those animal protein materials which are obtained from wild and domestic animals, fowl, and salt and fresh water fish and mammals and cereal grain materials which are obtained from field cereal grains.

DESCRIPTION OF PREFERRED EMBODIMENTS

The embodiments of this invention are directed to establishing methods for providing food and/or food supplements meeting all of the following requirements.

1. Be wholesome with high nutritional values, especiallly containing a balanced protein component.

2. Be storable for long periods of time under varying climatic conditions.

3. Be consistent in composition, commencing during manufacture and continuing on through shipment, storage, meal preparation and service, so no ablation or other separation occurs and the food when eaten will meet balanced diet standards, particularly sufficient protein content.

4. Be concentrated so relatively small amounts will give maximum nutritional value. Through such concentration, handling and distribution is improved. For example, dried products, having moisture removed, could be transported and handled much more economically than canned, frozen, or fresh foods. Furthermore most of the countries in which people are suffering from extreme malnutrition do not have adequate capabilities of producing or distributing canned, frozen or fresh foods.

In the practice of this invention animal protein materials are combined with cereal grains in ways to effectively thereafter resist ablation of the fortifying protein during normal handling, while meeting the four essential requirements set forth above. Some of the individual process steps followed and the equipment used have previously been employed and developed by others. However, to these earlier developments, there is always added the new step of chemically bonding the fortifying animal protein to the peeled, alkaline surfaced kernels of cereal grain using a food grade Food and Drug Administration approved acid such as acetic or hydrochloric acid.

This invention utilizes the Wurld wheat, Bulgar wheat, Fish Protein Concentrate processes, and/or other new processes by eventually taking animal proteins from selected animal proteins processes, often before final drying, etc., and entering the animal proteins into the cereal grains or wheat preparing processes before they are finally completed and/or dried. Following such entry of the animal proteins, the important step of chemically bonding, using a food grade Food and Drug Administration approved acid, is undertaken to finally set an ablation resistant outer layer or portions of an outer layer of animal protein over the alkaline surface of the cereal grains, the chemical bonding being followed by a minimum application of heat at lower temperatures, during final drying of this new food supplement and/or food product. These resulting combinations of cereal grains and animal proteins are provided in a completely balanced protein content, inclusive of all essential amino acids while retaining the original identity of the cereal grains. Therefore a group of combined products are now available, so one or more of these combined products is acceptable to all people, both as food additives and as complete foods, to be added to present protein deficient diets being consumed throughout the world. Everywhere in the world where the principal diet is composed of deficient protein foods such as rice, corn, wheat, or their flours, and/or other cereals and foods, one or more of these new combination food products, often obtained by utilizing one of the newer processes, is acceptable or will be found to be acceptable to these respective people. These structurally combined foods and food supplements may be processed or otherwise used by them in their traditionally acceptable manner. Although these food and food supplement combinations have their principal usage in feeding people, the feeding of animals is likewise improved through the practice of this invention.

The new foods, food supplements and methods to derive them will by necessity never be rigidly set for the source ingredients themselves will vary, the processing equipment will vary, and the customers orders, habits or needs will vary. However, to assist in the fuller understanding of the overall method and a resulting product, the following examples are given.

PROCESS STEPS OF ONE EMBODIMENT

Based upon 1,000 pounds of raw wheat input per hour, the processing steps used are, as follows:

1. Presoaking may be undertaken and if kept cold and extended in time, a very white product ultimately is obtained. In contrast, a warmer presoaking at higher temperatures during a shorter time (e.g., a 90 minute presoak at about 180°F.) leads to a darker tan or brown colored product.

2. In hot processing only and upon removal from presoaking, holding the wheat at 180°F. for 30 minutes is undertaken, and such temperature is maintained by injecting live steam.

3. Blanching follows using live steam for up to 20 minutes. During this blanching enzymes are destroyed, and heated wheat is more readily penetrated by moisture entering into the kernels.

4. Treating with an alkali by immersion and/or in a spray utilizing 40 pounds of sodium hydroxide mixed with 100 pounds of water which is added while hot at 180° F. to the wheat, which, with its included moisture, now weighs about 1,610 pounds. The contact with the alkali is only for two or three minutes to avoid any destruction of the protein in the wheat, and for this reason the immersion or spraying during this caustic treating step must be closely controlled.

5. Stopping the alkali action by the addition of water and causing peeling. About 10,150 pounds of water is used and swirled so bran will float to the surface and peeled wheat will drop to the bottom of the facility. The resulting pounds of product recovered are 2,350, and the pounds waste water discharged are 9,370 containing most of the sodium hydroxide.

6. Rinsing and screening of the peeled wheat kernels is then undertaken utilizing about 8,960 pounds of water and again more sodium hydroxide is removed so that the waste water weighs about 9,885 pounds.

7. Mixing 20 pounds of Fish Protein Concentrate is then accomplished, the animal protein chemically bonding with the alkaline surfaced cereal grains.

8. Treating with a food grade Food and Drug Administration approved acid such as acetic acid or hydrochloric acid follows to fix the chemical bonding of the Fish Protein Concentrate to the cereal grains, neutralize any remaining sodium hydroxide and also cause some bleaching effect.

9. Heating with a minimum application of heat during final drying to completely chemically set or bond the adhered animal protein to the cereal grains.

PROCESS STEPS OF ANOTHER EMBODIMENT

1. Whole kernels of wheat are immersed in water having a temperature up to 180°F.

2. Then the whole kernels of wheat are taken out and drained.

3. Thereafter an alkali, in a 20 to 50% concentrated aqueous solution by weight is applied utilizing 8 pounds, or one U.S. gallon of the alkaline solution, to a pound of grain, so all kernels of wheat are exposed to the alkali to remove the testa and germ and to relax the starch structure of the whole kernels of wheat.

4. Then the alkali solution is drained and prepared for recycling.

5. Thereafter the whole wheat kernels are placed into water to retard the alkaline action.

6. Subsequently this well diluted solution of alkaline and whole wheat kernels are handled in a water cyclone and then on a shaking screen or similarly effective drying equipment, to remove the excess water, alkaline, testas and germs.

7. Upon removal from the water cyclone and shaking screen apparatus, with some little water remaining, the whole wheat kernels are placed on another shaking screen and sprayed with more warm water to further retard the alkaline action, yet allow the peeling kernels of wheat to retain their alkaline surface.

8. Subsequently the whole wheat kernels, while still warm and swelled up and open, are placed into coating-predryer apparatus, such as a revolvable drum, and then during the revolutions of the drum the animal protein concentrate adheres to the whole wheat kernels and is held in and on the aleurone layer of the whole wheat kernel. Then the whole wheat kernels, with the adhered animal protein concentrate, are removed from the coating-predryer apparatus. Preferably, heat is applied during this protein fixing.

9. Then the whole wheat kernels are contacted with a warm dilute solution of acetic acid, being an 8% aqueous solution, by weight of acetic acid.

10. Thereafter the whole wheat kernels are drained and then rinsed with warm water.

11. Finally, additional drying is undertaken reducing the moisture content of the animal protein fortified peeled wheat kernels from about 60% to about 10% using heat in the temperature zone of 120° to 180°F., adjacent to the whole wheat kernels, and the heat applied (which is not steam) completes the process of this chemical bonding of the animal protein concentrate to the peeled wheat kernels. After this drying the animal protein remains tenaciously bonded to the peeled whole wheat kernels.

PROCESS STEPS OF ANOTHER EMBODIMENT

Farm grains of wheat are peeled with a cold alkali solution to remove the testa and germ. The peeled kernels of wheat grain having an alkaline surface are separated from the testa and germ. Dried or liquid protein is then added to the peeled kernels of wheat grain. Thereafter, a food grade acid is used to neutralize the protein fortified and peeled kernel units of wheat grains. Finally drying of the protein fortified cereal grain product is undertaken. The product is light in color, uniform in appearance, and the protein has reacted with the alkaline starch structure, and the acid has, during neutralization, precipitated and set the protein as an integral part of an aldehyde amino structure, so the protein does not abrade during commercial handling.

PROCESS STEPS OF ANOTHER EMBODIMENT

Farm grains of wheat are peeled with a hot alkali solution to remove testa and germ. The peeled kernels of wheat grain having an alkaline surface are separated from the testa and germ. Dried or liquid protein is then added to the peeled kernels of wheat grain. Thereafter, a food grade acid is used to neutralize the protein fortified and peeled kernel units of wheat grains. Finally drying of the protein fortified cereal grain product is undertaken. The product is darker in color, uniform in appearance, and the protein has reacted with the alkaline starch structure, and the acid has, during neutralization, precipitated and set the protein as an integral part of an aldehyde amino structure, so the protein does not abrade during commercial handling.

Comparison of Graham et al.'s Method and Product with Lonneker et al's Methods and Products

| As Per Graham et al | As per Lonneker et al | |
|---|---|---|
| Grain | Grain | |
| ALKALI HOT PEEL | ALKALI COLD PEEL | ALKALI HOT PEEL |
| Testa | Testa | Testa |
| Germ | Germ | Germ |
| Kernel | Kernel | Kernel |
| ACID NEUTRALIZE | | |
| Resets hard surface structure degraded | Alkaline surface increases the solubility, reaction of protein with surface structure | |
| | DRY | |
| | RESOAK WITH STEAM OR WATER | |
| Moistens starch surface. No starch structure change - surface dehydration or only mild gelatinization | | |

CONTINUED

| As Per Graham et al | As per Lonneker et al | |
|---|---|---|
| ADD DRY PROTEIN | ADD DRIED OR LIQUID PROTEIN AND THEN ACID FIX AND NEUTRALIZE | ADD DRIED OR LIQUID PROTEIN AND THEN ACID FIX AND NETURALIZE |
| TUMBLE GRAIN AND PROTEIN DRY | DRY | DRY |
| Product | Product | Product |
| 1. Mottled Appearance<br>2. Surface starchy layer is easily abraded and removed along with protein during handling and storage | 1. Light color<br>2. Uniform appearance<br>3. Protein has reacted with alkaline starch structure and acid has neutralized to precipitate and set protein, probably as an integral part of an aldehyde amino structure. Result: tightly adhering protein that will not abrade during handling | 1. Darker color<br>2. Uniform appearance<br>3. Protein has reacted with alkaline starch structure and acid has neutralized to precipitate and set protein, probably as an integral part of an aldehyde amino structure. Result: tightly adhering protein that will not abrade during handling |

TESTS UNDERTAKEN TO SHOW THE BENEFIT OF THE LONNEKER ET AL. BONDING OF THE ANIMAL PROTEINS TO THE PEELED KERNELS OF WHEAT GRAIN

Essentially all of the animal protein fixed to the peeled cereal grain kernels by the Lonneker et al. method is available in the final commercial product after it has been packaged and handled in the normal methods made necessary by mass scale production and distribution. This is not the case with other methods of fortifying cereal grains with a solid animal or vegetable protein. As shown in table of nutritional tests, the Protein Efficiency Values of products prepared by both Graham et al. and Lonneker et al. methods have been compared. The proteins and cereal grains were prepared by the specified techniques, poured into 50 lb. multi-wall paper bags and stored several months before testing. Every few days during the storage, the bags were picked up and turned over in order to simulate the conditions that occur during storage and shipping. When the bags were open prior to feeding tests, it was noticed that there was a large amount of powdered matter in the bottom of the bag of product prepared by Graham et al.'s method. The effects of this loss is well shown by the PER test results, whereby Graham et al.'s value is well below that of Lonneker et al.'s value. In regard to the Protein Efficiency Ratio Tests, i.e., P.E.R. tests, the following data is presented. Other tests have wider disparity. This occurs because when products produced by the Graham et al.'s method continue to be handled, the ablation continues and when tests are made after more handling, the P.E.R. ratio becomes poorer.

PER of Various Wheat and Fortified Wheat Diets as per the 28 Day Rat Feeding Tests (A.O.A.C)

| Protein Source | Wt. Gain* | Protein Intake** | P.E.R.*** |
|---|---|---|---|
| Peeled Wheat | 21.6 | 23.15 | 0.93 |
| Peeled Wheat + 5% FPC (Graham) 1] | 87.9 | 37.69 | 2.33 |
| Peeled Wheat + 5% FPC (Lonneker) 2] | 79.7 | 31.3 | 2.55 |
| Casein Control | 90.0 | 33.51 | 2.69 |
| Casein Control | 68.7 | 24.71 | 2.78 |

1] Prepared as per Graham et al patent
2] Prepared as per Lonneker et al patent application
*Average wt. gain per rat during 28 day test (wt. in gms.)
**Average protein intake per rat during 28 day test (wt. in gms.)
***Protein Efficiency Ratio (P.E.R.) is the wt. gain/ protein intake and is usually compared to casein control.
Note: All wheat and FPC for these tests were derived from the same sources. The wheat was Gains wheat from the Lonneker Farms and the FPC was obtained from Astra Nutrition (U.S.A.) Incorporated.

SUMMARY OF ADVANTAGES OF THE INVENTION

The invention is adaptable to currently practiced methods of preparing and handling cereal grain products and to methods of preparing and handling animal protein products with special reference to fish protein concentrate, i.e., F.P.C., using currently available equipment.

The invention, when it is to be adapted to some of the existing facilities and current processes or when it is to be included in new processing plants, always includes the steps of chemically bonding the animal protein to the cereal grains having alkaline surface conditions, and setting or fixing the bond by using food grade acids approved by the Food and Drug Administration, and then drying the combined food supplement or food at low enough temperatures to avoid destruction of the product. Because of this chemical bond, the food product will not deteriorate by ablation during all normal handling of this new protein fortified food or food supplement, wherever it may be shipped throughout the world.

This new food or new food supplement offers to all people throughout the world a better diet. Furthermore, this new food supplement or new food product is acceptable to most peoples of the world, being fully compatible with their traditional eating habits.

We claim:

1. A process for chemically bonding animal protein to peeled kernels of cereal grains, comprising the steps of:

a. subjecting kernels of cereal grains to a cold alkali solution to peel the same, removing and separating testa and germ from the kernels, leaving the surface of the peeled kernels alkaline thereby increasing the solubility and subsequent reaction of protein with the surface of the peeled kernels;

b. adding animal protein, either in its dried or liquid form, to the surface of the peeled kernels in an amount sufficient to produce a predetermined protein content;

c. adding to said protein coated cereal a food grade acid in an amount sufficient to set the animal protein and to neutralize the animal protein and peeled kernels; and d. drying the animal protein coated peeled kernels of cereal grains to completely set the adhered animal protein thereby creating a new food wherein the protein does not abrade.

2. A process for chemically bonding animal protein to peeled kernels of cereal grains, comprising the steps of:

a. subjecting kernels of cereal grains to a hot alkali solution to peel the same, removing and separating testa and germ from the kernels, leaving the surface of the peeled kernels alkaline thereby increasing the solubility and subsequent reaction of protein with the surface of the peeled kernels;

b. adding animal protein, either in its dried or liquid form, to the surface of the peeled kernels in an amount sufficient to produce a predetermined protein content;

c. adding to said protein coated cereal a food grade acid in an amount sufficient to set the animal protein and to neutralize the animal protein and peeled kernels; and d. drying the animal protein coated peeled kernels of cereal grains to completely set the adhered animal protein thereby creating a new food wherein the protein does not abrade.

3. A process for chemically bonding animal protein to peeled kernels of wheat, comprising the steps of:

a. immersing whole kernels of wheat in water having a temperature up to 180°F;

b. draining the whole kernels of wheat;

c. applying an alkali solution in a 20 to 50% range of concentration by weight utilizing 1 U.S. gallon of the alkali solution to a pound of wheat, exposing all kernels of wheat to the alkali to remove the testa and germ and to relax the starch structure of the whole wheat kernels;

d. draining the alkali solution from the wheat kernels;

e. placing the wheat kernels into water to stop the alkaline action;

f. draining said whole wheat kernels and their still remaining diluted alkaline solution to remove the excess water, alkali, testas and germs;

g. shaking and spraying with water the drained whole wheat kernels to further stop the alkaline action yet allowing the then peeled kernels of wheat to retain their alkaline surface;

h. placing both the wheat kernels while still warm, swelled and open and the animal protein concentrate into a coating-predryer apparatus in which the animal protein concentrate contacts the gelatinized surface of the peeled wheat kernels and is held in and on the aleurone layer of the whole wheat kernels;

i. contacting said coated whole wheat kernels with a warm dilute solution of acetic acid;

j. draining and rinsing the whole wheat kernels with warm water; and k. finally drying the protein fortified peeled wheat kernels for a period of time sufficient to reduce the moisture content to below 15%, using drying temperatures ranging between 120° to 180°F.

4. A process for chemically bonding animal protein to peeled kernels of wheat comprising the steps of:

a. presoaking raw wheat kernels in water having a temperature below 150° F;

b. heating and holding the presoaked wheat kernels below 150°F for 30 minutes;

c. blanching the heated wheat kernels;

d. treating the blanched wheat kernels with an alkali solution, up to a 50% concentration by weight, utilizing 1 U.S. gallon of the alkali solution to a pound of grain, exposing all kernels of wheat to the alkali to remove the testa and germ and to relax the starch structure of the whole wheat kernels;

e. stopping the alkali action by adding water and causing peeling as the water containing the wheat kernels is swirled so the bran and the wheat germ will float to the surface and thus be separated from the wheat kernels;

f. rinsing and screening said alkali peeled wheat kernels;

g. mixing animal protein concentrate with the alkali peeled wheat kernels to chemically bond the animal protein with the alkaline surfaced peeled wheat kernels;

h. treating the peeled protein bonded wheat kernels with a food grade acid to fix the chemical bonding of the animal protein concentrate and thereafter neutralize the protein fortified wheat grains; and i. heating and drying the chemically bound animal protein and peeled wheat kernels to complete the process of chemical bonding.

* * * * *